Nov. 24, 1942.  C. T. WALTER  2,303,010
DIAL SCALE ATTACHMENT
Filed Nov. 9, 1939  2 Sheets-Sheet 1

Charles T. Walter
INVENTOR

Nov. 24, 1942.    C. T. WALTER    2,303,010
DIAL SCALE ATTACHMENT
Filed Nov. 9, 1939    2 Sheets-Sheet 2
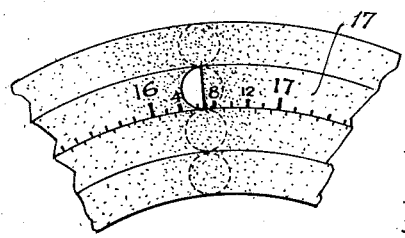
Fig.3
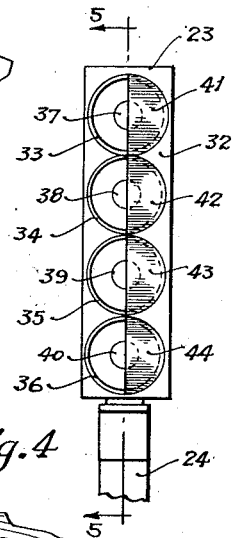
Fig.4
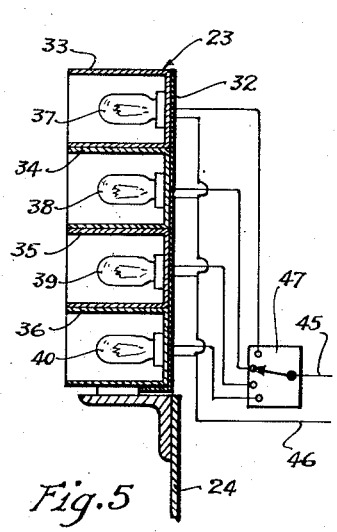
Fig.5
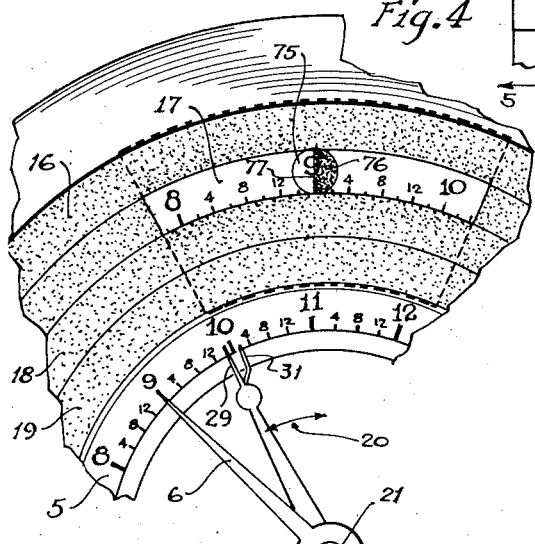
Fig.7
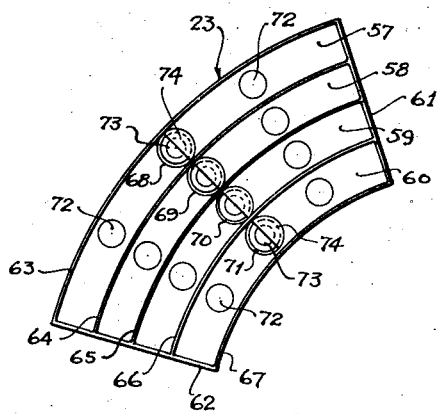
Fig.6
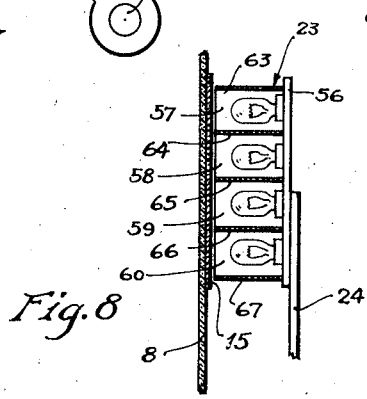
Fig.8
Charles T. Walter
INVENTOR
BY
ATTORNEY Patented Nov. 24, 1942

2,303,010

UNITED STATES PATENT OFFICE 2,303,010

DIAL SCALE ATTACHMENT

Charles T. Walter, Chicago, Ill., assignor to Industrial Patents Corporation, Chicago, Ill., a corporation of Delaware Application November 9, 1939, Serial No. 303,659

24 Claims. (Cl. 265—29)

This invention relates to weighing scales, more particularly to weighing scales adapted for facilitating the determination of the quantities of curing pickle to be pumped into meat, and also for measuring the quantity of curing pickle which is supplied to the meat.

One of the objects of this invention is to provide means to facilitate the determination of the quantity of pickling brine which is to be supplied to meat.

Another object of this invention is to provide means to reduce the possibility of human error to a minimum in determining the proportional quantity of curing brine which is to be pumped into meat.

Other objects and advantages of this invention will become apparent from the description and claims which follow. Like numerals in the several figures indicate similar parts.

Figure 3 is an enlarged detail view of a portion of the supplementary chart face illustrating an illuminated portion of a supplementary scale dial.

Figure 4 is a front view of the supplementary scale dial illuminating means.

Figure 5 is a sectional view of the illuminating device of Figure 4 taken on line 5—5.

Figure 6 is a front view of a modified form of supplementary scale dial illuminating device.

Figure 7 is an enlarged detail view of a portion of the supplementary scale dial and the standard scale dial illustrating an illuminated portion of the supplementary scale dial.

Figure 8 is a sectional view of the illuminating unit of Figure 6.

Figure 1:
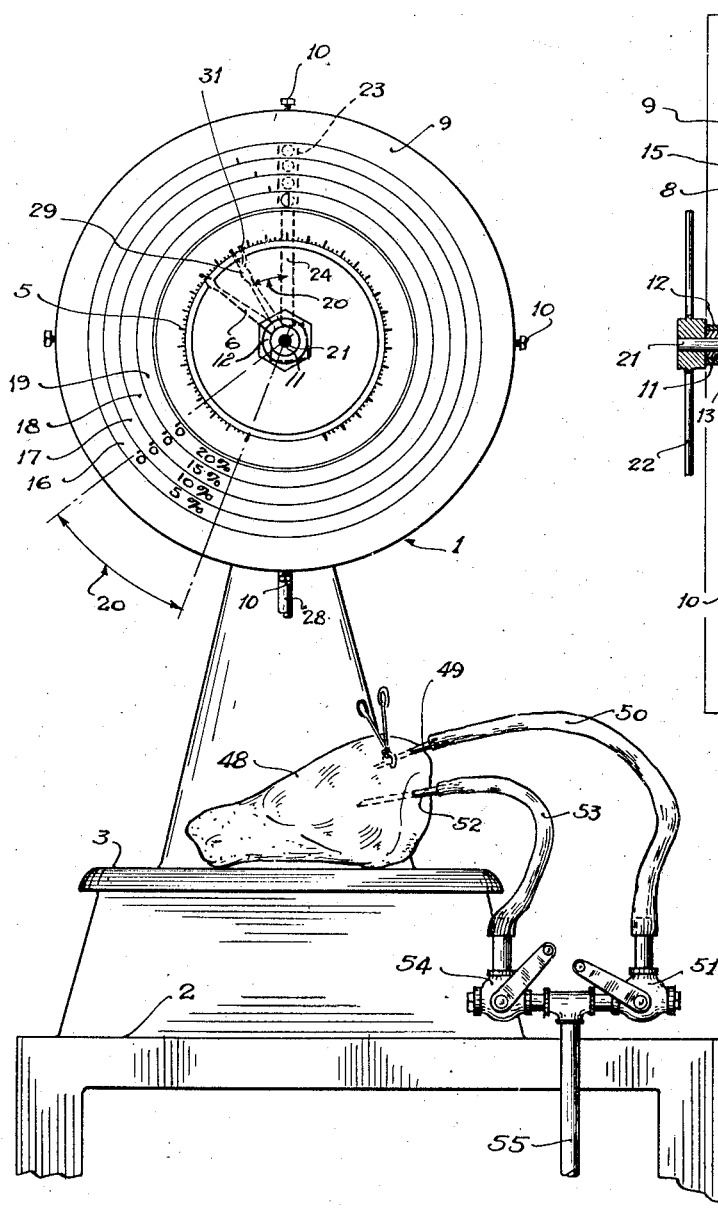
Figure 1 is a front view of a conventional scale upon which is mounted the attachment of the present invention and the view is taken as on line 1—1 of Figure 2.

In the practice of curing meat, for example, ham, by injecting the curing fluid into the vascular system of the meat, for example, according to the method disclosed and claimed in U. S. Patent No. 1,951,436, the quantity of curing fluid which is injected into the meat bears a definite relationship to the weight of the individual piece of meat. This relationship is generally expressed as a percentage of the net weight of the meat. The value of this percentage may vary between wide limits, depending upon the characteristics desired in the finished cured product. For example, in curing hams, a range of from five per cent to twenty-five per cent is employed in commercial practice, depending upon the individual ham, and the type of final product which is desired.

In the commercial practice of the method described and claimed in U. S. Patent No. 1,951,436, the operator is required to carry out certain mental and physical operations. The injection needles or hypodermic needles are attached to the ham at the desired locations and the ham then placed on the weighing platform of a scale to determine its net weight, the scale being loaded or counterbalanced to correct for the weight of the needles and other attachments. The operator then notes the net weight of the ham and consults a chart to determine the quantity of curing fluid which is to be pumped into the ham. After this quantity has been determined from the chart, the operator opens a valve to admit the curing pickle into the ham. The operator is required to keep a close watch on the scale pointer as the weight increases as injection proceeds. When the scale pointer has indicated that the desired quantity of curing fluid has been pumped into the ham, the operator quickly closes the valve to arrest the flow of fluid through the injection needle.

In the case of certain types of hams, it is desired to inject a fixed quantity of curing fluid into the lean portion of the ham which is not reached by the injection into the main vascular system. After the desired proportional quantity of curing fluid has been pumped into the ham through the vascular system, the operator carefully notes the weight indicated by the scale needle and then opens a second valve. The desired fixed quantity of fluid is then determined by carefully observing the increase in weight as indicated by the scale needle. When the desired fixed quantity has been pumped into this portion of the ham, the second valve is closed.

It is apparent that the opportunity for error is great. The operator must consult a chart to determine the quantity of curing fluid to be pumped into the ham and must make a mental addition of the quantity indicated on the chart to the net weight of the ham as indicated by the scale pointer. The operator must then keep in mind the desired scale reading while the injection of curing fluid proceeds. If, for some reason, the operator's attention is taken from the scale dial, it is very likely that the desired scale reading will be forgotten. This results in either over-pumping or under-pumping of the ham or meat product.

If it is desired to pump a fixed quantity of curing fluid into the lean portion of the ham after the desired proportional portion of the curing fluid has been pumped into the vascular system, the operator must closely note the weight indicated by the scale needle of the ham plus its proportional quantity of curling fluid, and must then make a mental addition of the desired fixed quantity to the weight indicated by the scale pointer. This will give him the desired gross weight of the ham plus all of the curing fluid, and this weight must be kept in mind while the desired fixed quantity of curing fluid is pumped into the ham. When the scale pointer registers or indicates the desired final weight, the operator then closes the valve and arrests the flow of fluid to the ham.

The present invention contemplates the provision of an attachment adapted for use with standard types of weighing scales whereby the mental operations required of the operator are reduced to a minimum. After the ham or other meat is placed on the scale platform, the operator makes a simple adjustment which indicates the desired increase in weight to supply the desired proportional quantity of curing fluid to the ham, and also the desired fixed quantity of curing fluid to the ham.

In the apparatus illustrated in the drawings, scale 1 is mounted on table 2. Scale 1 is provided with a scale platform 3 and a scale face housing 4 in which are mounted the scale face or scale dial 5 and pointer 6. An auxiliary housing 7 is securely fastened to the front end of scale face housing 4.

The auxiliary housing 7 is closed by a glass cover plate 8, which is secured to auxiliary housing 7 by means of a retaining ring 9 which may be bolted to housing 7. A plurality of adjusting screws 10 are provided around the periphery of housing 7 to provide means for centering the cover plate 8 with respect to the axis of the scale pointer. To insure a vaporproof and waterproof seal, a soft rubber gasket may be provided between scale face housing 4 and the auxiliary housing 7, and suitable gaskets are provided between auxiliary housing 7 and cover plate 8, and between cover plate 8 and retaining ring 9.

Cover plate 8 is provided with a central opening in which is mounted bearing 11 having an outwardly projecting flange. A flanged nut 12 is threaded on bearing 11. Bearing 11 is securely fastened to cover plate 8 by tightly clamping the cover plate 8 between the flange on bearing 11 and the flanged nut 12. Suitable gaskets 13 and 14 are provided between the glass cover plate and the flanges to provide a waterproof and vaporproof seal, and also to permit the bearing to be securely fastened to the glass plate without injuring the glass cover plate 8.

A translucent chart 15 is secured to the inner surface of cover plate 8 and bears a series of supplementary scale dials or indicia, each of the series of indicia being advanced with respect to the standard weight indicia by a fixed percentage. The chart may be of translucent paper or transparent cellulosic material having the indicia printed thereon. The supplementary series of indicia are divided off on concentric circles, and the concentric circles are centered with respect to the center of cover plate 8, which is in turn concentric with respect to the axis of scale pointer 6 and the standard scale dial 5. Any desired number of supplementary scales may be provided, in the drawings four scales being illustrated, namely, scales 16, 17, 18, and 19, which represent five per cent, ten per cent, fifteen per cent, and twenty per cent, respectively.

In calibrating the supplementary scale dials, the angular spacing between the uniformly spaced calibrations of the standard scale dial 5 is taken as unity. The angular spacing between corresponding graduations or indicia in any angular ring of any of the supplementary scale dials is unity plus the desired percentage of unity. For example, the supplementary indicia of series 17 are calibrated on a ten per cent basis. If the angular spacings of a differential of one pound on the standard scale dial is taken as unity, the angular spacing between a differential of one pound on the supplementary series 17 will be equal to 1.10 times the unity angle. The one pound indicium on series 17 will, therefore, be 1.10 times the unity angle from the zero point, the two pound indicium will be two times 1.10 times the unity angle from the zero point, etc. The zero indicium or zero line of each of the supplementary series of indicia is on a single radial line which is displaced an angle 20 in advance of the zero point or indicium of the standard scale dial 5.

A shaft 21 is journaled in bearing 11 and projects inwardly of casing 7. A hand wheel 22 is securely fastened to the outer end of shaft 21. A supplementary scale dial illuminating unit 23 is supported immediately behind supplementary scale dial 15, being mounted on arm 24, which is rigidly secured to flanged collar 25. Collar 25 is securely fastened to shaft 21. Conductors 26, which supply the electrical current to illuminating unit 23, may be wrapped between the flanges of flanged sleeve 27 and are carried externally of the housing 7 through a conduit 28, which may be at the bottom of the housing.

Figure 2:
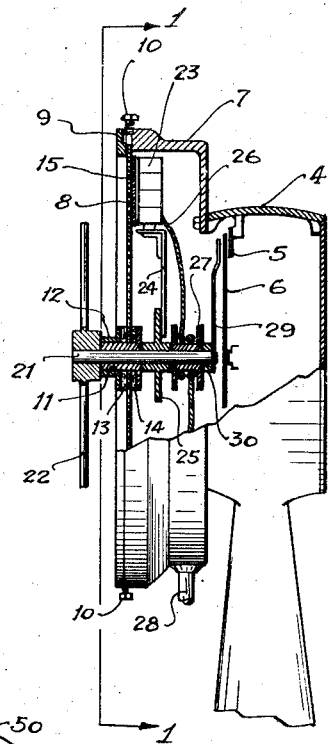
Figure 2 is a side view, partly in section, showing the scale and the scale attachment.

An indexing pointer 29 is securely fastened to a collar 30, which is in turn securely fastened to the inner end of shaft 21. The angular distance between the reading point of indexing pointer 29 and the reading line or index line of illuminating unit 23 is equal to the angular distance 20 between the zero line of the standard weight scale 5 and the zero line of the supplementary scale dials. The angular relation between illuminating unit 23 and arm 24 and indexing pointer 29 is provided to enable the operator to have a clear vision of indexing pointer 29, which is in a plane behind arm 24, as is clearly shown in Figure 2. Any convenient angle may be employed, for example, in the drawings, an angle of about thirty degrees is illustrated. In any event, however, the angles 20 must be equal.

The indexing pointer 29 is provided with a second reading point or vane 31, which is spaced from the reading point of indexing pointer 29 an angular distance equivalent to any desired fixed amount, for example, in the drawings, vane 31 is advanced an angular distance equivalent to about two ounces.

Illuminating unit 23 comprises a base plate 32 on which is mounted a plurality of cells 33, 34, 35, and 36, in which are mounted bulbs 37, 38, 39, and 40, respectively. One-half of the open end of cells 33, 34, 35, and 36 is closed, by means of semi-circular opaque plates 41, 42, 43, and 44, respectively. The straight edges of semi-circular opaque plates 41, 42, 43, and 44 are in alignment and lie in a radial line extending through the axis of shaft 21. The incandescent bulbs receive power from lines 45 and 46, a selector switch 47 being interposed in line 45 to permit the selection of any desired incandescent bulb. The illuminating unit 23, as stated before, is mounted in close proximity to the supplementary scale chart 15. Light cells 33, 34, 35, and 36 occupy a position immediately behind supplementary scales 16, 17, 18, and 19, respectively.

The operator may illuminate a small portion of any desired supplementary series of indicia by adjustment of selector switch 47. For example, in the drawings, the selector switch 47 is adapted to supply current from lines 45 and 46 to incandescent bulb 38. Light cell 34 is immediately behind series of indicia 17, and that portion of indicia which is immediately adjacent the open end of a cell 34 will be illuminated by transmitted light, as illustrated in Figure 3. The indicia which overlie the open portion of cell 34 will, therefore, stand out because they are visible by transmitted and reflected light while the balance of the chart is visible only by reflected light.

In the use of the scale attachment of the present invention, the operator places a ham 48 upon the scale platform 3. Injection needle 49, which is attached to flexible tubing 50, which is in turn connected with valve 51, is inserted into the exposed end of the vascular system of ham 48. Injection needle 52 is inserted into the lean portion of ham 48 and is connected with flexible tubing 53, which is in turn connected with valve 54. The curing fluid is supplied to valves 51 and 54 under pressure through line 55. The operator then notes the net weight of the ham as indicated by scale pointer 6 on scale dial 5. The scale is previously counterbalanced for the tare weight or the weight of the injection needles, flexible tubing, and the like, so that scale pointer 6 registers only the net weight of the ham on scale dial 5.

Assuming that the ham is to be supplied with twenty per cent curing fluid, the operator adjusts selector switch 47 to illuminate bulb 40 in light cell 36. That portion of the supplementary series of indicia 19 which overlies the open end of cell 36 will stand out because of the light which is transmitted through the translucent chart 15. Assuming that the net weight of the ham is ten pounds, the operator then moves hand wheel 22 so as to bring the index line of the light cell 36 coincident with the ten pound indicium on the supplementary series of indicia 19. The ten pound indicium on supplementary series 19 is ten times 1.20 times the unity angle, or is twelve times the unity angle. Since indexing pointer 29 is secured to shaft 21, indexing pointer 29 will be rotated or moved through the same angle as illuminating unit 23. Since indexing pointer 29 trails arm 24 and illuminating unit 23 by an angle which is equal to the angle of advancement of the zero point of the secondary series of indicia from the zero point of the standard weight indicia, indexing pointer 29 will coincide with the twelve pound indicium on the standard weight indicia 5. Indexing pointer 29 is thereby located at a point which is twenty per cent in advance of the weight indicated by the scale pointer 6. The indexing pointer thereby indicates to the operator the point to which the weight must be increased to add twenty per cent to the net weight of the ham.

The operator then opens valve 51 to allow the curing fluid to be pumped into the vascular system of the ham. The operator closely notes the change in weight as indicated by scale pointer 6 and allows the curing fluid to be pumped into the ham until scale pointer 6 is coincident with indexing pointer 29. When this position has been reached, the weight of the ham has been increased twenty per cent, and the operator stops the flow of curing fluid by again closing valve 51.

It will be noted that with this attachment, an indication of the correct final weight of the ham is maintained until the position of the indexing pointer is altered by the operator. There is, therefore, no chance of error on the part of the operator in computing the final weight of the ham, and there is no chance in the operator's forgetting what the final weight of the ham should be.

In the case of certain types of hams, it is desired to inject an additional fixed quantity of curing fluid into the cushion side of the ham. This amount is generally about two ounces. As stated before, vane 31, which is attached to indexing pointer 29, is spaced from the reading edge of indexing pointer 29 an amount which is equivalent to the angular distance of a differential of two ounces on scale dial 5. After the desired proportional quantity of curing fluid has been pumped into the ham, scale pointer 6 is coincident with indexing pointer 29. Vane 31 marks the final weight of the ham after the desired amount of curing fluid is pumped into the vascular system and into the cushion side of the ham. The operator opens valve 54, which permits curing fluid to be pumped into the cushion side of the ham, and as the weight of the ham increases, scale pointer 6 again moves. When the scale pointer is coincident with vane 31, the operator closes valve 54. At this point the desired quantity of curing fluid has been injected into both the vascular system of the ham and into the cushion side of the ham.

The final weight of the ham is indicated by the scale pointer 6 and vane 31 and, if desired, the operator may record this final weight. The initial net weight of the ham before pumping is indicated by the reading on the supplementary series of indicia 19 so that, if required, the operator may also not this weight. After the ham has been removed from the scale, the initial net weight and the final pumped weight are indicated on the supplementary series 19, and vane 31, respectively, and if the operator has not made a record of the weight while the ham was on the scale, the weight may be recorded after the ham is removed. The weight will be indicated until the operator moves illuminating unit 23 and indexing pointer 29 by means of hand wheel 22.

In the supplementary scale chart of Figures 1 and 3, the indicia are visible by reflected light. The illuminated spot or portion which overlies the open end of the selected light cell of the illuminating unit 23 is employed to adjust the unit 23 and arm 24 and the indexing pointer 29 to the desired position. The sharply defined straight line across the diameter of the semicircular spot of light is employed as the reading or indexing line.

In Figures 6, 7, and 8, a further type of illuminating unit 23 is illustrated. In this modification, scale chart 15 is visible only by transmitted light, and the chart may be printed on the rear surface of translucent material or may be printed in the usual manner on paper or cellulosic material and a thin sheet of translucent material placed between supplementary scale chart 15 and cover plate 8. The illuminating unit 23 is mounted in close proximity behind supplementary scale chart 15 and is adapted to illuminate a small segment of any one of the series of supplementary scales.

The illuminating unit comprises a base 56 which is securely fastened to arm 24. Light cells or illuminating cells 57, 58, 59, and 60 are formed on base 56 by transverse end plates 61 and 62, which are securely fastened to base 56 and arcuate partitions 63, 64, 65, 66, and 67, which are also secured to base 56. The arcuate partitions coincide with the arcs upon which the secondary series of indicia are printed. For example, arcuate partitions 65 will closely coincide with the arc upon which the series of indicia 17 are inscribed. An individual light cell 68, 69, 70, and 71 is mounted at or near the center of the light cells 57, 58, 59, and 60, respectively. Two or more incandescent bulbs 72 are mounted in each of the light cells 57, 58, 59, and 60. An incandescent bulb 73 is mounted in each of the individual light cells 68, 69, 70, and 71. One half of the open end of each of the individual light cells is closed by means of an opaque shield or plate 74. The straight edge side 77 of the semi-circular opaque plate is aligned on a radial line with respect to the axis of shaft 21.

To facilitate reading of the supplementary scale indicia, it is desirable that the incondescent bulbs 73 be of a higher candle power, or the light from the open end of individual cells 68, 69, 70, and 71 be more intense than the light issuing from the open end of illuminating cells 57, 58, 59, and 60. If incandescent lamps 72 and 73 are of the same candle power, the open end of light cells 57, 58, 59, and 60 may be covered by a color filter. In any event, the purpose of these arrangements is to provide a sharp contrast between the spot of light of the individual light cells and the transmitted light from the light cells 57, 58, 59, and 60.

Figure 7 illustrates a front view of a portion of the supplementary scale dial and the standard scale dial. The supplementary chart appears blank except for that portion of supplementary series of indicia 17 which is visible by transmitted light. In this position of the illuminating unit 23, selector switch 47 is adjusted to illuminate light cell 58 and the individual cell 69. The transmitted light is sufficiently intent or bright to render that portion of the series 17 readily readable. At or near the center of the illuminated area there is a contrasting bright semi-circular spot 75 which is illuminated by the more intense light issuing from the open end of individual light cell 69. Immediately adjacent the bright semi-circular spot 75 is a darkened semi-circular spot 76. If desired, the opaque plate 74 may be removed and a cross hair placed diametrically across the open end of cell 69 or any of the other individual light cells. If a cross hair is used, the entire area overlying the individual light cell will be brightly illuminated and a dark line will be found across the center of the brightly illuminated circular spot. The straight edge 77 of the dark spot 76, or the line formed by the cross hair, serves as the indexing or reading point.

In adjusting the illuminating unit 23 and indexing pointer 29, hand wheel 22 is moved in the desired direction. The illuminated segment moves around the chart and enables the operator to readily find the desired point on the supplementary chart which corresponds to the net weight of the ham as indicated by scale pointer 6. The exact setting of the illuminating unit 23 and indexing pointer 29 is determined by the indexing line or straight line 77 or the sharp indexing line formed by a cross hair.

In the use of the modified illuminating unit, the operation is the same as described in connection with Figures 1 to 5. In Figure 7, the ten per cent supplementary scale dial is illuminated. The scale needle or pointer 6 indicates that the net weight of the ham on the scale platform is nine pounds. The operator moves hand wheel 22 until the indexing line 77, which divides the brightly illuminated spot 75 and the darkened spot 76, coincides with the nine pound indicium on the supplementary series of indicia 17. The nine pound indicium on the supplementary series of indicia 17 is nine times 1.10 times unity angle, or is advanced nine tenths of a pound with respect to the nine pound indicium on the standard scale dial 5. Indexing pointer 29 is, therefore, nine tenths of a pound in advance of the scale pointer 6. The operator then pumps the desired proportional quantity of curing fluid into the ham, at which time the scale pointer 6 moves to coincide with indexing pointer 29. The desired fixed quantity of curing fluid is then pumped into the ham until the scale pointer 6 coincides with vane 31 of the indexing pointer. At this point the desired proportional and fixed quantity of curing fluid has been pumped into the ham.

It is apparent that there is little chance for human error since the operator is not required to make any mental calculations, nor is he required to consult a chart to determine the quantity of curing fluid which is to be pumped into the meat. The operator is required only to adjust selector switch 47 to provide illumination for the desired supplementary scale, and to adjust the illuminating unit 23 and indexing pointer 29 by movement of hand wheel 22 into a position wherein indexing line 77 coincides with a weight indicium on the desired supplementary scale which corresponds to the weight indicium indicating the net weight of the meat on scale dial 5. Such adjustment automatically moves indexing pointer 29 to the position which indicates the desired final weight of the product after the curing fluid has been pumped into the meat.

I claim:

1. In a weighing scale including a housing and a standard scale dial and pointer mounted in the housing, an auxiliary housing, a cover plate for the auxiliary housing, a supplementary scale chart mounted on the cover plate, the supplementary scale chart comprising a plurality of series of supplementary scale indicia, each of the series of indicia being advanced with respect to the standard scale indicia by a predetermined fixed percentage, an illuminating unit for the supplementary scale chart mounted rotatably in the auxiliary housing and including indicating means cooperating with said supplementary chart adapted to be moved about the supplementary scale chart, and an indexing pointer mounted rotatably in the housing adjacent the standard scale dial and adapted to be moved simultaneously with the illuminating unit.

2. In a weighing scale including a housing and a standard scale dial and pointer mounted in the housing, an auxiliary housing, a cover plate for the auxiliary housing, a supplementary scale chart mounted on the cover plate, the supplementary scale chart comprising a plurality of series of supplementary scale indicia, each of the series of indicia being advanced with respect to the standard scale indicia by a predetermined fixed percentage, a supplementary scale chart illuminating unit mounted rotatably in the auxiliary housing and including indicating means cooperating with said supplementary chart adapted to be moved about the supplementary scale chart, the illuminating unit comprising a plurality of light cells, one light cell being positioned immediately behind each of the series of supplementary scale indicia, means for illuminating any selected light cell, and an indexing pointer mounted rotatably in the housing and adapted to be moved simultaneously with the illuminating unit.

3. In a weighing scale including a standard scale dial, a supplementary scale chart comprising a plurality of series of supplementary indicia, each of the series being advanced with respect to the standard scale indicia by a predetermined fixed percentage, and an illuminating unit positioned immediately behind the supplementary scale chart, the illuminating unit comprising a base plate and a plurality of light cells on the base plate, one light cell being positioned immediately behind each of the series of supplementary indicia, said illuminating unit including indicating means cooperating with said supplementary chart, and an indexing means fixedly mounted with respect to said unit, said indexing means cooperating with said standard dial, and means for selectively illuminating any of the light cells.

4. In a weighing scale including a standard scale dial, a supplementary scale chart bearing a plurality of series of supplementary indicia, each of the series being advanced with respect to the standard scale indicia by a predetermined percentage, and an illuminating unit positioned immediately behind the supplementary scale chart, the illuminating unit comprising a plurality of tubular light cells, each of the light cells being positioned immediately behind one of the series of supplementary indicia, said illuminating unit including indicating means cooperating with said supplementary chart, and an indexing means fixedly mounted with respect to said unit, said indexing means cooperating with said standard dial.

5. In a weighing scale including a standard scale dial, a supplementary scale chart comprising a plurality of series of supplementary indicia, each of the series being advanced with respect to the standard scale indicia by a predetermined percentage, and a supplementary scale chart illuminting unit comprising a base plate, a plurality of tubular light cells mounted on the base plate, one light cell being positioned immediately behind each of the series of supplementary indicia, an incandescent bulb mounted in each of the light cells, and a semi-circular opaque plate mounted at the open end of each of the light cells, said plate being disposed to cooperate with said supplementary chart to provide an indicating means, an indexing means fixedly mounted with respect to said unit, said indexing means cooperating with said standard dial, and means for selectively illuminating any of the light cells.

6. In a weighing scale including a standard scale dial bearing a series of standard weight indicia, a supplementary scale chart bearing a plurality of series of supplementary indicia, each of the series of supplementary indicia being advanced with respect to the standard indicia by a predetermined percentage, an illuminating unit mounted immediately behind the supplementary scale chart, and adapted to be moved over the supplementary scale dial, the illuminating unit comprising a base, a plurality of arcuate light cells mounted on the base, a plurality of incandescent bulbs mounted in each of the arcuate light cells, a tubular light cell mounted at the center of each of the arcuate light cells, an incandescent bulb mounted in each of the individual tubular cells, a semi-circular plate mounted at the open end of each of the tubular cells, each of the arcuate light cells and associated tubular light cell being positioned immediately behind one of the series of supplementary indicia, said plate being disposed to cooperate with said supplementary chart to provide an indicating means, an indexing means fixedly mounted with respect to said unit, said indexing means cooperating with said standard dial, and means for selectively illuminating any desired arcuate light cell and associated tubular light cell.

7. In a weighing scale including a housing and a standard scale dial mounted in the housing, an auxiliary housing secured to the front face of the housing, a cover plate for the auxiliary housing, the cover plate having a centrally located opening therein, a shaft mounted rotatably in the opening, a supplementary scale chart mounted on the cover plate, the supplementary scale chart bearing a plurality of series of supplementary scale indicia, each of the series of indicia being advanced with respect to the standard scale indicia by a predetermined fixed percentage, an illuminating unit secured to the shaft within the auxiliary housing and positioned immediately behind the supplementary scale chart, and an indexing pointer secured to the shaft and positioned adjacent the standard scale dial, the illuminating unit comprising a base plate, a plurality of tubular light cells mounted on the base plate, one light cell being positioned immediately behind each of the series of supplementary indicia, an incandescent bulb mounted in each of the light cells, a semi-circular opaque plate mounted at the open end of each of the light cells adjacent the supplementary scale chart, said plate being disposed to cooperate with said supplementary chart to provide an indicating means, an indexing means fixedly mounted with respect to said unit, said indexing means cooperating with said standard dial, and means for illuminating any selected light cell.

8. In a weighing scale including a housing and a standard scale dial mounted in the housing, an auxiliary housing secured to the front face of the housing, a cover plate for the auxiliary housing, the cover plate having a centrally located opening therein, a shaft mounted rotatably in the opening, a supplementary scale chart mounted on the cover plate, the supplementary scale chart bearing a plurality of series of supplementary scale indicia, each of the series of indicia being advanced with respect to the standard scale indicia by a predetermined fixed percentage, an illuminating unit secured to the shaft within the auxiliary housing and positioned immediately behind the supplementary scale chart, and an indexing pointer secured to the shaft and positioned adjacent the standard scale dial, the illuminating unit comprising a base plate, a plurality of arcuate light cells mounted on the base, a plurality of incandescent bulbs mounted in each of the light cells, a tubular light cell mounted at the center of each of the arcuate light cells, an incandescent bulb in each of the tubular light cells, a semi-circular opaque plate mounted at the open end of each of the tubular light cells adjacent the supplementary scale chart, each of the arcuate light cells and associated tubular light cell being positioned immediately behind one of the series of supplementary indicia, said plate being disposed to cooperate with said supplementary chart to provide an indicating means, an indexing means fixedly mounted with respect to said unit, said indexing means cooperating with said standard dial, and means for illuminating any selected arcuate light cell and associated tubular light cell.

9. A weighing scale comprising a scale platform, a scale face housing, a standard scale dial mounted in the scale face housing, a scale pointer mounted rotatably in the housing and operatively connected to the scale platform, an auxiliary housing mounted at the open end of the scale face housing, a cover plate for the auxiliary housing, a supplementary scale chart mounted on the cover plate, the cover plate having a central opening therein, a bearing mounted in the central opening in the cover plate, a shaft mounted rotatably in the bearing and projecting inwardly and outwardly of the cover plate, a hand wheel fastened securely to the outwardly projecting end of the shaft, a supplementary scale chart illuminating unit including indicating means cooperating with said supplementary chart mounted securely on the shaft within the housing and being positioned immediately behind the supplementary scale chart, the supplementary scale chart bearing a plurality of series of supplementary indicia, each of the series being advanced with respect to the standard indicia by a fixed predetermined percentage, and an indexing pointer cooperating with the standard dial and securely mounted to the inner end of the shaft adjacent the scale pointer, the illuminating unit comprising a base, a plurality of arcuate light cells mounted on the base, a plurality of incandescent bulbs in each of the light cells, a tubular light cell mounted at the center of each of the arcuate light cells, an incandescent bulb in each of the tubular light cells, each of the arcuate light cells being positioned immediately behind one of the series of supplementary indicia, and means for illuminating any selected light cell.

10. In a weighing scale including a standard scale chart and an indicator pointer movable relative to the standard scale chart, a supplementary scale chart mounted relative to the standard scale chart and having weight indicia offset with respect to the indicia of the standard scale chart by a predetermined fixed percentage, and an illuminating unit adapted for selective movement in functional relationship with the supplementary chart, said unit having indicating means cooperating with said supplementary chart, the illuminating unit including an indexing pointer movable therewith and relative to the standard scale chart.

11. In a weighing scale including a standard scale chart and an indicator pointer movable relative to the standard scale chart, a supplementary scale chart mounted relative to the standard scale chart and having weight indicia offset with respect to the indicia of the standard scale chart by a predetermined fixed percentage, an illuminating unit adapted for selective movement in functional relationship with the supplementary chart, said unit having indicating means cooperating with said supplementary chart, and an indexing pointer movable in fixed relationship with the illuminating unit and relative to the standard scale chart.

12. In a weighing scale including a standard scale chart and an indicator pointer movable relative to the standard scale chart, a supplementary scale chart mounted relative to the standard scale chart and having weight indicia offset with respect to the indicia of the standard scale chart by a predetermined fixed percentage, an illuminating unit providing indicator means for the supplementary scale chart and adapted for selective movement in functional relationship with the supplementary scale chart, and an indexing pointer movable in fixed relationship with the illuminating unit and relative to the standard scale chart.

13. In a weighing scale including a housing and a standard scale chart and an indicator pointer movable relative to the standard scale chart mounted within the housing, a cover plate for the housing, a supplementary scale chart mounted on the cover plate relative to the standard scale chart, the supplementary scale chart having weight indicia offset with respect to the indicia of the standard scale chart by a predetermined fixed percentage, an illuminating unit providing indicator means for the supplementary scale chart and adapted for selective rotation in functional relationship with the supplementary scale chart, and an indexing pointer movable in fixed relationship with the illuminating unit and relative to the standard scale chart.

14. In a weighing scale including a housing and a standard scale chart and an indicator pointer movable relative to the standard scale chart mounted within the housing, a cover plate for the housing, a supplementary scale chart mounted on the cover plate relative to the standard scale chart, the supplementary scale chart having weight indicia offset with respect to the indicia of the standard scale chart by a predetermined fixed percentage, an illuminating unit providing indicator means for the supplementary scale chart and adapted for selective rotation in functional relationship with the supplementary scale chart, and an indexing pointer movable in fixed relationship with the illuminating unit and relative to the standard scale chart.

15. In a weighing scale including a standard scale chart and an indicator pointer movable relative to the standard scale chart, a supplementary scale chart mounted relative to the standard scale chart and having a plurality of series of supplementary weight indicia, each of the series of supplementary weight indicia of the supplementary scale chart being advanced with respect to the indicia of the standard scale chart by a predetermined fixed percentage, and an illuminating unit adapted for selective movement in functional relationship with the supplementary scale chart, the illuminating unit comprising a plurality of light cells, each of the light cells being positioned to illuminate one of the series of supplementary indicia to the exclusion of the remainder of the series of supplementary indicia, said unit including indicating means cooperating with said supplementary chart and indexing means cooperating with said standard chart.

16. In a weighing scale including a standard scale chart and an indicator pointer movable relative to the standard scale chart, a supplementary scale chart mounted relative to the standard scale chart and having a plurality of series of supplementary weight indicia, each of the series of supplementary weight indicia of the supplementary scale chart being advanced with respect to the indicia of the standard scale chart by a predetermined fixed percentage, an illuminating unit adapted for selective movement in functional relationship with the supplementary scale chart, the illuminating unit comprising a plurality of light cells, each of the light cells being positioned to illuminate one of the series of supplementary indicia to the exclusion of the remainder of the series of supplementary indicia, and means for selectively illuminating any desired light cell, said unit including indicating means cooperating with said supplementary chart and indexing means cooperating with said standard chart.

17. In a weighing scale including a standard scale chart and an indicator pointer movable relative to the standard scale chart, a supplementary scale chart mounted relative to the standard scale chart and having a plurality of series of supplementary weight indicia, each of the series of supplementary weight indicia of the supplementary scale chart being advanced with respect to the indicia of the standard scale chart by a predetermined fixed percentage, an illuminating unit adapted for selective movement in functional relationship with the supplementary scale chart, the illuminating unit comprising a plurality of light cells, each of the light cells being positioned to illuminate one of the series of supplementary indicia to the exclusion of the remainder of the series of supplementary indicia, means for selectively illuminating any desired light cell, said unit having indicating means cooperating with said supplementary chart, and an indexing pointer movable in fixed relationship with the illuminating unit and relative to the standard scale chart.

18. In a weighing scale including a housing and a standard scale chart and an indicator pointer movable relative to the standard scale chart mounted within the housing, an auxiliary housing, a cover plate for the auxiliary housing, the cover plate having an opening therein, a shaft mounted rotatably in the opening, a supplementary scale chart mounted on the cover plate and relative to the standard scale chart, the supplementary scale chart having a weight indicia offset with respect to the indicia of the standard scale chart by a predetermined fixed percentage, and an illuminating unit rigidly secured to the shaft within the auxiliary housing, the illuminating unit being adapted for selective rotation in functional relationship with the supplementary scale chart, said unit including indicating means cooperating with said supplementary chart and indexing means cooperating with said standard chart.

19. In a weighing scale including a housing and a standard scale chart and an indicator pointer movable relative to the standard scale chart mounted within the housing, an auxiliary housing, a cover plate for the auxiliary housing, the cover plate having a centrally located opening therein, a shaft mounted rotatably in the opening, a supplementary scale chart mounted on the cover plate and relative to the standard scale chart, the supplementary scale chart having a plurality of series of supplementary weight indicia, each of the series of supplementary weight indicia of the supplementary scale chart being offset with respect to the indicia of the standard scale chart by a predetermined fixed percentage, and an illuminating unit rigidly secured to the shaft within the auxiliary housing and adapted for selective rotation in functional relationship with the supplementary chart, the illuminating unit comprising a plurality of light cells, each light cell being adapted to illuminate one of the series of supplementary scale indicia to the exclusion of the remainder of the series of supplementary scale indicia, said unit including indicating means cooperating with said supplementary chart and indexing means cooperating with said standard chart.

20. In a weighing scale including a housing and a standard scale chart and an indicator pointer movable relative to the standard scale chart mounted within the housing, an auxiliary housing, a cover plate for the auxiliary housing, the cover plate having a centrally located opening therein, a shaft mounted rotatably in the opening, a supplementary scale chart mounted on the cover plate and relative to the standard scale chart, the supplementary scale chart having a plurality of series of supplementary weight indicia, each of the series of supplementary weight indicia of the supplementary scale chart being offset with respect to the indicia of the standard scale chart by a predetermined fixed percentage, an illuminating unit rigidly secured to the shaft within the auxiliary housing and adapted for selective rotation in functional relationship with the supplementary chart, the illuminating unit comprising a plurality of light cells, each light cell being adapted to illuminate one of the series of supplementary scale indicia to the exclusion of the remainder of the series of supplementary scale indicia, means for selectively illuminating any desired light cell, said unit having indicating means cooperating with said supplementary chart, and an indexing pointer rigidly secured to the shaft and positioned adjacent the standard scale chart.

21. In a weighing scale including a standard scale chart and an indicator pointer movable relative to the standard scale chart, a supplementary scale chart mounted relative to the standard scale chart and having weight indicia offset with respect to the indicia of the standard scale chart by a predetermined fixed percentage, and indicator means adapted for selective movement in functional relationship with the supplementary chart, the indicator means including an indexing pointer movable therewith and relative to the standard scale chart.

22. In a weighing scale having a standard scale chart and an indicator pointer movable relative to the standard scale chart, a supplementary scale chart mounted relative to the standard scale chart and having weight indicia offset with respect to the indicia of the standard scale chart by a predetermined fixed percentage, and indicator means adapted for selective movement in functional relationship with the supplementary chart, the indicator means including an indexing pointer movable therewith and relative to the standard scale chart, said indicator means comprising a light cell positioned to one side of the supplementary scale chart for the passage of light through the supplementary scale chart.

23. In a weighing scale including a housing and a standard scale chart and an indicator pointer movable relative to the standard scale chart mounted within the housing, a cover plate for the housing, the cover plate having an opening therein, a shaft rotatably mounted in the opening, a supplementary scale chart mounted on the cover plate and relative to the standard scale chart, the supplementary scale chart having a weight indicia offset with respect to the indicia of the standard scale chart by a predetermined fixed percentage, and indicator means rigidly secured to the shaft within the housing, the indicator means being adapted for selective rotation in functional relationship with the supplementary scale chart, the indicator means including an indexing pointer movable therewith and relative to the standard scale chart.

24. In a weighing scale including a housing and a standard circular scale chart, an indicating pointer operatively associated with the weighing system and movable about a fixed point of rotation, said pointer cooperating with the standard chart, a supplementary scale chart mounted in concentric relation around said standard chart, said supplementary chart bearing weight indicia offset with respect to the indicia of the standard chart by a predetermined fixed percentage, a supplementary indicator pivotally mounted to rotate about said fixed point, the supplementary indicator being carried by a relatively wide arm and adapted for selective rotation in functional relationship with the supplementary chart, indexing means fixedly secured to said supplementary indicator, and having a tip cooperating with said standard chart, the weight indicia of said supplementary chart being rotated in one direction about said fixed point, a determined angle from a common base line for the indicia of both said charts, the tip of said indexing means being spaced from said arm in a direction opposite to the direction of rotation of the supplementary chart an amount equal to the determined angle, whereby due to the rotation of the supplementary chart with respect to the standard chart the relatively wide arm is displaced from the zone of movement of said indicating pointer so that a clear view of its movement is possible.

CHARLES T. WALTER.